(12) United States Patent
Lair et al.

(10) Patent No.: US 7,818,036 B2
(45) Date of Patent: Oct. 19, 2010

(54) TECHNIQUES FOR WIRELESSLY CONTROLLING PUSH-TO-TALK OPERATION OF HALF-DUPLEX WIRELESS DEVICE

(75) Inventors: John Lair, Salt Lake City, UT (US); Anthony J. Sutera, Midway, UT (US); Douglas H. Dobyns, Lindon, UT (US)

(73) Assignee: Radeum, Inc., Orem, UT (US)

( * ) Notice: Subject to any disclaimer, the term of this patent is extended or adjusted under 35 U.S.C. 154(b) by 0 days.

(21) Appl. No.: 11/264,169

(22) Filed: Nov. 2, 2005

(65) Prior Publication Data

US 2006/0073787 A1    Apr. 6, 2006

Related U.S. Application Data

(63) Continuation-in-part of application No. 10/828,480, filed on Apr. 21, 2004, now Pat. No. 7,149,552.

(60) Provisional application No. 60/527,776, filed on Dec. 9, 2003, provisional application No. 60/503,949, filed on Sep. 19, 2003.

(51) Int. Cl.
    *H04M 1/00*    (2006.01)

(52) U.S. Cl. ............... 455/575.2; 455/569.1; 455/74.1; 455/425; 455/556.1; 455/575.6; 381/74; 381/370; 381/376

(58) Field of Classification Search ............... 455/74.1, 455/550, 575.1, 568, 569.1, 518, 519, 575.2, 455/407, 408, 420, 425, 556.1, 557, 575.6, 455/90.2; 381/74, 370, 374–383
See application file for complete search history.

(56) References Cited

U.S. PATENT DOCUMENTS

| 4,132,861 | A |   | 1/1979 | Frieder, Jr. et al. |
| 4,334,315 | A |   | 6/1982 | Ono et al. |
| 5,029,214 | A | * | 7/1991 | Hollander ............ 704/272 |
| 5,101,504 | A | * | 3/1992 | Lenz .................... 455/78 |

(Continued)

FOREIGN PATENT DOCUMENTS

| EP | 0 798 474 | 10/1997 |
| JP | 10150694 | 6/1998 |

OTHER PUBLICATIONS

Jtech Australia Pty Ltd., 2-Way Radios, printed Mar. 16, 2004, 2 pages {http://www.jtech.com.au/2way.asp?p=products}.

(Continued)

*Primary Examiner*—Wayne Cai
(74) *Attorney, Agent, or Firm*—Jefferson IP Law, LLP; Raymond B. Persino

(57) ABSTRACT

Disclosed herein is a communications system implementing a headset wirelessly connected to a half-duplex communications device, such as a two-way radio or a radio-simulating cellular phone. The headset may incorporate a transmit/receive switch wherein a transmit signal is wirelessly transmitted from the headset to the communications device to direct the communications device to enter into a transmit mode. Alternatively, a wireless transmit/receive switch may be implemented separately from the wireless headset, where the wireless transmit/receive switch may be positioned in the proximity of the communications device and the headset and may be engaged by a user to direct the communications device to enter a transmit mode.

86 Claims, 14 Drawing Sheets

U.S. PATENT DOCUMENTS

| | | | |
|---|---|---|---|
| 5,118,309 A | 6/1992 | Ford | |
| 5,263,181 A | 11/1993 | Reed | |
| 5,265,264 A | 11/1993 | Dzung et al. | |
| 5,276,916 A | 1/1994 | Pawlish et al. | |
| 5,448,620 A | 9/1995 | Gershkovich et al. | |
| 5,479,474 A | 12/1995 | Schwartzman et al. | |
| 5,568,516 A | 10/1996 | Strohallen et al. | |
| 5,659,156 A | 8/1997 | Mauney et al. | |
| 5,678,207 A | 10/1997 | Williams et al. | |
| 5,748,707 A | 5/1998 | Sanserino | |
| 5,771,438 A | 6/1998 | Palermo et al. | |
| 5,790,681 A | 8/1998 | Leppälahti | |
| 5,912,925 A | 6/1999 | Palermo et al. | |
| 5,926,532 A | 7/1999 | Peck | |
| 5,969,698 A | 10/1999 | Richard et al. | |
| 5,982,764 A | 11/1999 | Palermo et al. | |
| 5,987,146 A | 11/1999 | Pluvinage et al. | |
| 6,104,816 A | 8/2000 | Downs, Jr. et al. | |
| 6,121,881 A | 9/2000 | Bieback et al. | |
| 6,230,029 B1 | 5/2001 | Hahn et al. | |
| 6,298,249 B1 | 10/2001 | Locarno et al. | |
| 6,304,559 B1 | 10/2001 | Jacklin et al. | |
| 6,311,052 B1 | 10/2001 | Lenz | |
| 6,351,653 B1 | 2/2002 | Alberth, Jr. et al. | |
| 6,424,820 B1 | 7/2002 | Burdick et al. | |
| 6,459,371 B1 | 10/2002 | Pike | |
| 6,459,882 B1 | 10/2002 | Palermo et al. | |
| 6,522,894 B1 | 2/2003 | Schmidt | |
| 6,671,379 B2 | 12/2003 | Nemirovski | |
| 6,681,022 B1 | 1/2004 | Puthuff et al. | |
| 6,688,421 B2 | 2/2004 | Dyer et al. | |
| 6,745,014 B1 * | 6/2004 | Seibert et al. | 455/74.1 |
| 6,795,718 B2 | 9/2004 | Bae | |
| 6,819,762 B2 | 11/2004 | Jones et al. | |
| 6,823,195 B1 | 11/2004 | Boesen | |
| 6,950,627 B2 | 9/2005 | Vicari | |
| 7,010,332 B1 | 3/2006 | Irvin et al. | |
| 7,035,608 B2 | 4/2006 | Palermo et al. | |
| 7,058,384 B2 | 6/2006 | Davies | |
| 7,149,552 B2 | 12/2006 | Lair | |
| 2002/0057746 A1 | 5/2002 | Chen | |
| 2002/0068600 A1 | 6/2002 | Chihara et al. | |
| 2002/0107053 A1 | 8/2002 | Petez et al. | |
| 2002/0132585 A1 * | 9/2002 | Palermo et al. | 455/41 |
| 2002/0160722 A1 | 10/2002 | Terranova et al. | |
| 2003/0059078 A1 | 3/2003 | Downs, Jr. et al. | |
| 2003/0092399 A1 | 5/2003 | Davies | |
| 2003/0100274 A1 | 5/2003 | Brown | |
| 2003/0120487 A1 | 6/2003 | Wang | |
| 2003/0207694 A1 | 11/2003 | Legare et al. | |
| 2003/0211871 A1 * | 11/2003 | Nassimi | 455/575.1 |
| 2003/0224825 A1 | 12/2003 | Cox et al. | |
| 2003/0224838 A1 | 12/2003 | Skillicorn et al. | |
| 2004/0022395 A1 | 2/2004 | Turnbull | |
| 2004/0198425 A1 * | 10/2004 | Mellone et al. | 455/553.1 |
| 2004/0198436 A1 | 10/2004 | Alden | |
| 2005/0057359 A1 * | 3/2005 | Coffey et al. | 340/539.21 |
| 2005/0164636 A1 | 7/2005 | Palermo et al. | |
| 2006/0073825 A1 | 4/2006 | Palermo et al. | |
| 2007/0004464 A1 | 1/2007 | Lair et al. | |
| 2007/0082611 A1 | 4/2007 | Terranova et al. | |

OTHER PUBLICATIONS

Motorola Intelligence Everywhere, MTH500 Motorola Tetra Portable Radio, 2001, 2 pages.

UHF Wireless Intercom, System 800, Home Electronics, Inc., 2 pages {Date Unknown}.

Earmark, Base Stations: CON-KIT Base Station, printed Mar. 16, 2004, 2 pages {http://www.earmark.com/products/conbase.html}.

Motorola Intelligence Everywhere, Enhance your MTH650 Tetra handportable terminal with a wide range of accessories, May 14, 2003, 6 pages.

Logitech, Mobile Phone Headsets, printed Apr. 6, 2004 {http://www.logitech.com/index.cfm/products/productlist/US/EN,crid=1627,ad=lgpr_mobile}.

Eartec, Voice Activated or push to talk wireless, ProTalk UHF, printed Mar. 24, 2004, 3 pages, {http://www.eartec.com/protalk.html}.

Jabra, Freespeak 250, The cordless headset for bluetooth mobile phones, 2004, 2 pages.

Eartec, Heavy Duty Headsets, printed Mar. 24, 2004, 3 pages, {http://www.eartech.com/ultra.html}.

Bluetooth Weblog, Frog Design/Motorola Offspring Wearables Concept, printed Aug. 4, 2003, 3 pages, {http://bluetooth.weblogs.com/discuss/msgReader$532?mode=topic}.

Eartec, Specialty Headset Communication Systems, Brochure {Date Unknown}.

Uniden WHAM Accessory Wireless Microphone Owner's Manual, Sep. 20, 2002.

* cited by examiner

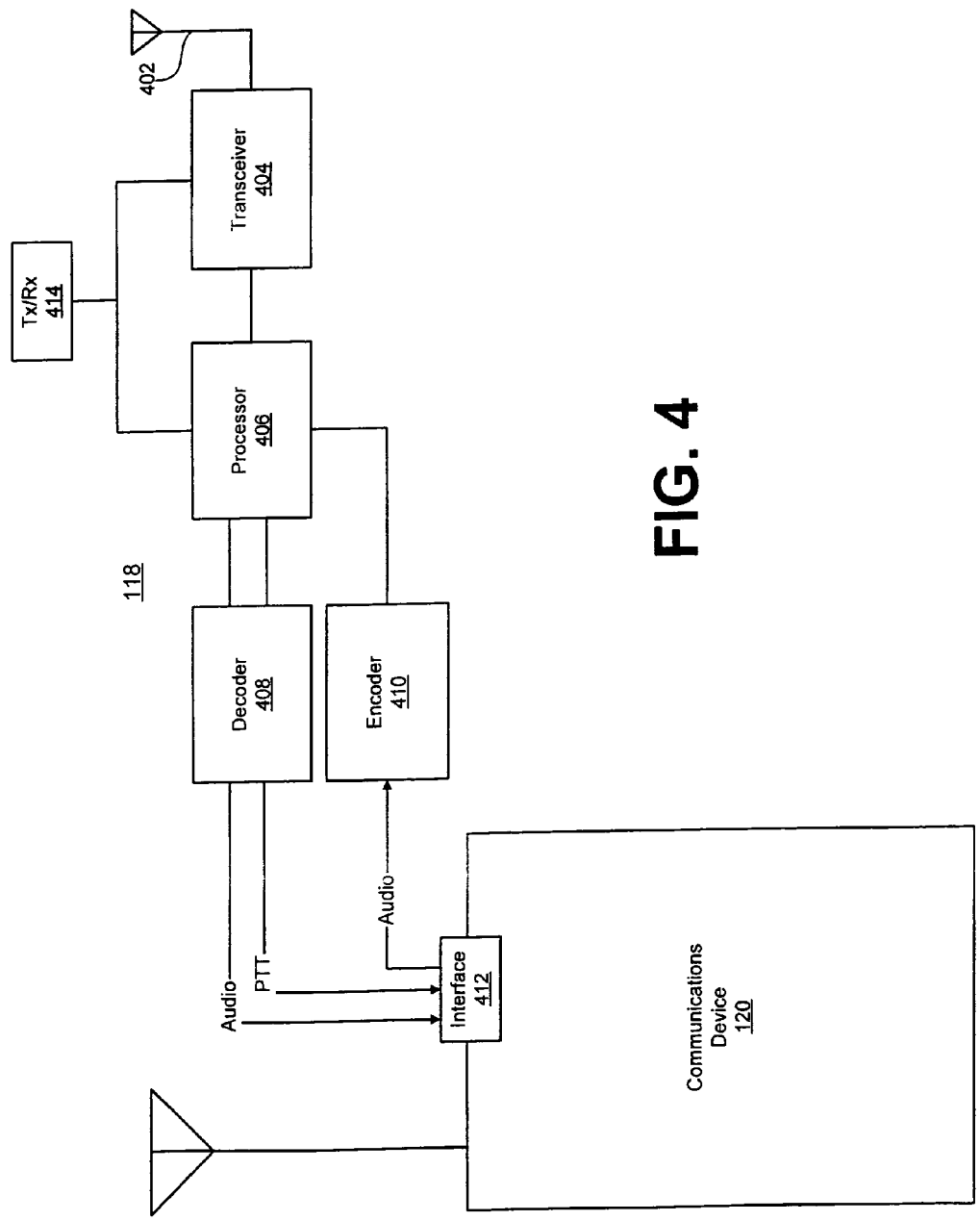

TECHNIQUES FOR WIRELESSLY CONTROLLING PUSH-TO-TALK OPERATION OF HALF-DUPLEX WIRELESS DEVICE

CROSS-REFERENCE TO RELATED APPLICATIONS

This application is a continuation-in-part of U.S. patent application Ser. No. 10/828,480 filed Apr. 21, 2004, now U.S. Pat. No. 7,149,552, which claims benefit of U.S. Patent Application No. 60/503,949, filed Sep. 19, 2003, and entitled "Wireless Headset for Two-Way Radios" and U.S. Patent Application No. 60/527,776, filed Dec. 9, 2003 and entitled "Wireless Headset for Communication Device," the entireties of which are incorporated by reference herein.

FIELD OF THE INVENTION

The present invention relates generally to half-duplex communications and more particularly to utilizing a push-to-talk (PTT) feature in a wireless headset.

BACKGROUND OF THE INVENTION

Half-duplex communications devices, such as two-way radios (or "walkie-talkies") and cellular phones having a half-duplex or similar service, such as the DIRECT CONNECT® cellular walkie-talkie service offered by Nextel Communications, Inc. of Reston, Va. or the Push to Talk Group Calling feature offered by Verizon Wireless of Bedminster, N.J., frequently are used to facilitate communications between mobile users, such as emergency personnel and construction workers. Because half-duplex communications devices generally are not configured to support simultaneous two-way communications, one or more mechanisms typically are implemented to help ensure that the half-duplex device is in a transmit mode only at the appropriate times. One such mechanism includes a voice operated (VOX) feature whereby a user's voice or other sound triggers the communications device to enter a transmit mode. Another mechanism includes a push-to-talk (PTT) button which places the communications device in a transmit mode while pressed or engaged and returns the communications device to a receive mode when the PTT button is released or disengaged. Thus, while the VOX feature benefits from not requiring the user to manipulate a button to switch the communications device between the transmit and receive mode, the VOX feature typically fails to operate accurately or correctly in noisy environments as the VOX feature often inadvertently interprets loud noises as a voice signal and therefore needlessly places the communications device in transmit mode. Accordingly, the use of a PTT button is frequently implemented for use in noisy environments.

Conventional implementations of PTT buttons (i.e., transmit/receive switches) are not without their drawbacks. For one, the location of the PTT button often causes significant inconvenience to the user. In many instances, the PTT button is located on the communications device which in turn is often placed about the user's body, thereby requiring the user to grasp for the communications device to engage the PTT button. Alternatively, some conventional implementations place the PTT button on a wire connecting a headset to the communications device. While this location for the PTT button may make it somewhat easier to quickly locate the PTT button, it will be appreciated that the wire is likely to become entangled with the user or with other equipment in the proximity due to its length and location.

Accordingly, improved techniques for implementing a PTT button functionality in a half-duplex communications device would be advantageous.

SUMMARY OF THE INVENTION

The present invention mitigates or solves the above-identified limitations in known solutions, as well as other unspecified deficiencies in known solutions. A number of advantages associated with the present invention are readily evident to those skilled in the art, including economy of design and resources, transparent operation, cost savings, etc.

In accordance with one embodiment of the present invention, a wireless headset is provided. The wireless headset comprises a switch for indicating a provision of audio information for transmission and means for wirelessly transmitting a signal representative of an engagement of the switch.

In accordance with another embodiment of the present invention, an apparatus is provided. The apparatus comprises an interface operably connected to a half-duplex communications device, a wireless interface; means for receiving a first transmit mode signal via the wireless interface, the transmit mode signal indicating a provision of audio information for transmission by the half-duplex communications device, and means for providing a second transmit mode signal to the half-duplex communications device via the interface to direct the half-duplex communications device to switch to a transmit mode.

In accordance with yet another embodiment of the present invention, a system is provided. The system comprises a half-duplex communications device and a headset wirelessly connected to the half-duplex communications device. The headset is adapted to wirelessly transmit a transmit mode signal for reception by the half-duplex communications device, the transmit mode signal indicating a provision of audio information by the headset for transmission by the half-duplex communications device. The half-duplex communications device is adapted to transmit at least a portion of the audio information based at least in part upon receipt of the transmit mode signal.

In accordance with an additional embodiment of the present invention, a system is provided. The system comprises a half-duplex communications device, a transmit switch assembly wirelessly connected to the half-duplex communications device and a headset wirelessly connected to the half-duplex communications device. The transmit switch assembly is adapted to wirelessly transmit a transmit mode signal for reception by the half-duplex communications device, the transmit mode signal indicating a provision of audio information by the headset for transmission by the half-duplex communications device. The half-duplex communications device is adapted to transmit at least a portion of the audio information based at least in part upon receipt of the transmit mode signal.

In each of the above embodiments, the wireless transmission is conducted over a short range. This short range transmission is especially suited to transmission by magnetic induction. The wireless transmission by magnetic induction operates within a small operational bubble that provides secure communication.

Still further features and advantages of the present invention are identified in the ensuing description, with reference to the drawings identified below.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which:

FIG. 4 is a schematic diagram of an exemplary wireless adaptor for a communications device in accordance with at least one embodiment of the present invention.

DETAILED DESCRIPTION OF THE INVENTION

The following description is intended to convey a thorough understanding of the present invention by providing a number of specific embodiments and details involving the communication of information using multiple wireless channels. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

For ease of illustration, the present invention is described herein in the context of a half-duplex communications system wherein a wireless channel is reserved for the transmission of information through the use of a PTT mechanism. However, using the guidelines provided herein, the present invention also may be implemented in pseudo-half-duplex communications systems, such as, for example, the DirectConnect® cellular phone feature offered by Nextel Communications of Reston, Va., or other communications systems wherein a PTT mechanism or similar transmit/receive switch mechanism is used to reserve a wireless channel for the transmission of information. Accordingly, reference herein to half-duplex includes true half-duplex and other similar communications techniques unless otherwise noted.

The present invention is described primarily is the context of portable communications devices. Portable communications devices are typically designed to be carried by a user. Accordingly, portable communications are typically battery powered. Portable communications devices may be regulated differently from other communications devices such as by lower limits on transmission power. Portable communications devices may be distinguished from fixed communications devices. Fixed communications devices are installed in fixed location. Portable communication devices may also be distinguished from mobile communications devices. Mobile communications are installed in or on a vehicle. Mobile communications devices typically do not include batteries as they draw power from the vehicles electrical system.

Figure 1A:
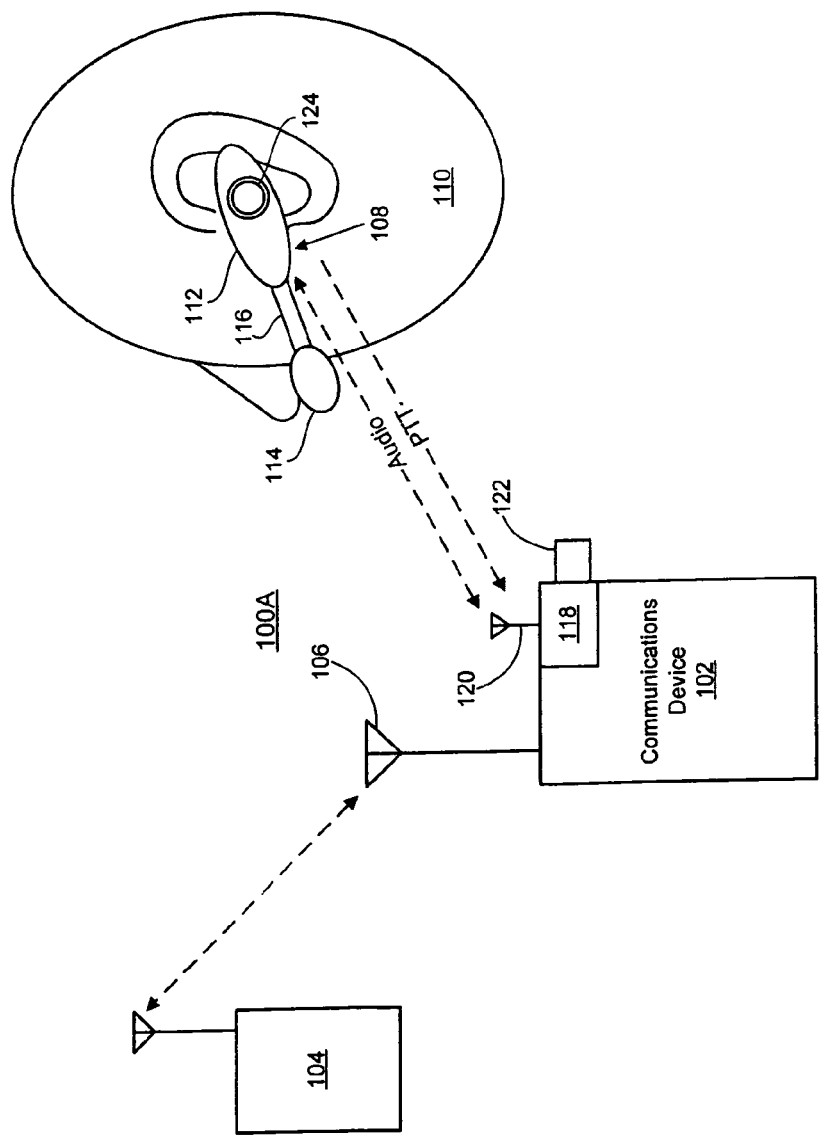
FIGS. 1A-1C are schematic diagrams of exemplary wireless communications systems implementing wireless headsets in accordance with at least one embodiment of the present invention.
Figure 1B:
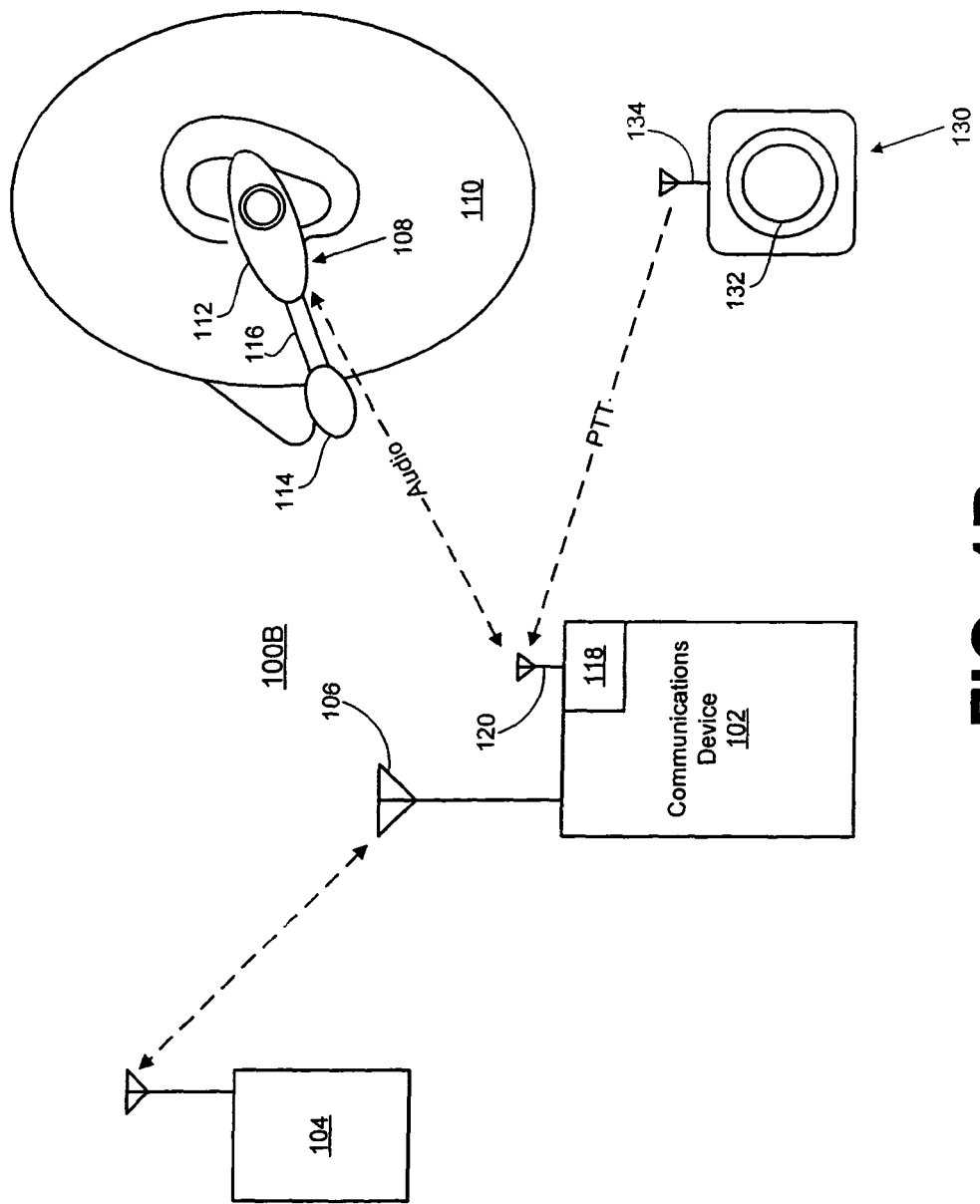
Figure 1C:
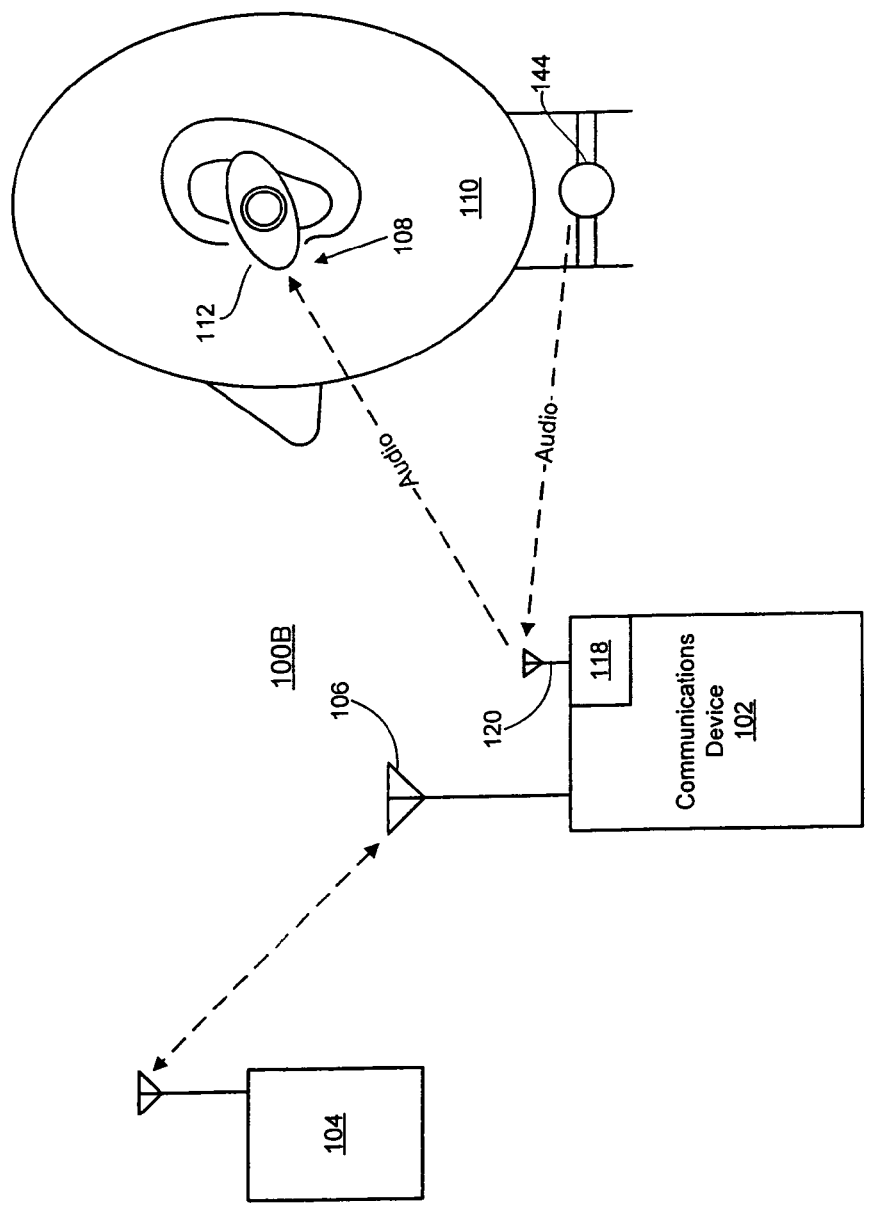

Referring now to FIGS. 1A-1C, exemplary half-duplex systems 100A, 100B and 100C are illustrated in accordance with at least one embodiment of the present invention. System 100A includes a communications device 102 (e.g., a half-duplex radio or cellular phone) in communication with another communications device 104. Communications device 102 may include, as is typical of two-way radios and cellular phones, a speaker and a microphone. Communications between the devices 102 and 104 may be half-duplex transmissions and may be transmitted wirelessly via an antenna 106 or may be transmitted via a conductive wire, fiber optic cable, and the like.

In at least one embodiment, a wireless headset 108 is utilized to facilitate the transmission of audio information and other information (e.g., video information) between the communications device 102 and a user 110. As discussed below with reference to FIGS. 2A-2C, the headset 108 may be implemented as an earbud-type or ear-clip type headset which may utilize a relatively small headset body 112 operably connected to an earbud speaker (not shown) for outputting audio information and a microphone assembly 114 for inputting audio information (such as the vocalizations of the user 110). As depicted in the illustrated embodiment, the microphone assembly 114 may be operably connected to the headset body 112 via a boom 116. Alternatively, the microphone assembly 114 may be implemented on a wire connected to the headset body 112 which may be clipped to the clothing of the user 110, for example. The microphone assembly 114 may include any of a variety of microphones, including, but not limited to, throat microphones, boom microphones, bone induction microphones (i.e., microphones placed in the ear canal which pick up audio signals via vibrations in the ear canal), and the like.

As illustrated in greater detail with reference to FIGS. 2D-2G, the headset 108 alternately may be implemented as a headband-type headset having one or two ear pads or cups connected via one or more bands that encircle at least part of the head or neck of the user 110.

The headset 108 preferably is configured to wirelessly communicate audio information to and from the communications device 102. Accordingly, as discussed in detail below, the headset 108 may utilize a wireless interface comprising at least an antenna or transducer and a transceiver to transmit and receive analog and/or digital signals representative of audio information or other information. A preferred embodiment of the wireless interface is a magnetic induction link. Accordingly, the communications device 102 may include a module capable of wirelessly communicating with the headset 108 via, for example, the antenna 106, or a wireless adapter 118 may be used to wirelessly relay information between the headset 108 and the communications device 102 via, for example, the antenna 106 or a separate antenna or transducer 120. To illustrate, the wireless adapter 118 may include a device that connects to a commercial radio handset (one embodiment of the communications device 102) via, for example, a socket or jack conventionally used to connect the radio handset to a wired headset. When a handset or headset is connected to the socket or jacket, any speaker or microphone of the communications device is disabled as appropriate. Audio information from the communications device 102 may be provided to the wireless adapter 118 via the socket or jack and the wireless adapter 118 may transmit the audio information wirelessly for reception by the headset 108. Conversely, audio information may be transmitted wirelessly from the headset to the wireless adapter 118 and the wireless adapter 118 then may provide an electric or optical signal representative of the audio information to the communications device 102 via the socket or jack.

In one embodiment, the wireless adapter 118 draws operational power through the socket or jack from the communications device 102. In this embodiment, the wireless adapter requires no independent power source such a battery. The wireless adapter may include a power switch. The power switch is a mechanism that disconnects the electrical and data connections of the wireless adapter 118 from the communications device 102, although the adapter 118 may remain physically attached to the communications device 102. With the power switch turned off the wireless adapter 118 configures the connections of the socket or jack such that the communications device 102 operates as if the adapter 118 is not present. For example, if the communications device 102 is configured to disable an onboard speaker and onboard microphone upon connection of a device to the socket or jack, turning the power switch off on wireless adapter 118 will cause the onboard speaker and onboard microphone to be enabled. Switching the power switch off will also disable any communication link established between the wireless adapter 118 and the wireless headset 108.

As noted above, the communications device 102 may be configured to operate in a half-duplex communications mode and may rely on some type of transmission indication to indicate when the user 110 has audio information to transmit to the communications device 104. Conventionally, the transmission indication is supplied through the use of a transmit/receive switch positioned on or near the communications device which provides a signal that indicates that the transmission medium is reserved for the transmission of information by the communications device. Accordingly, in at least one embodiment, a transmit/receive switch is implemented to provide such a transmission indication, where the transmit/receive switch may include, for example, a push button, a toggle switch, a slide switch, a capacitive switch, and the like. The transmit/receive switch may be positioned on or near the communications device 102, such as, for example, the transmit/receive switch 122 connected to or implemented as part of the wireless adapter 118. Alternatively, the transmit/receive switch may be positioned on or operably connected to the wireless headset 108, such as, for example, the transmit/receive switch 124 positioned on the body 112 of the headset 108. To illustrate, the transmit/receive switch could be positioned on a side of the body 112 of the headset 108 that is facing or resting against the user's head such that the user 110 may press the body 112 of the headset 108 against the user's head to engage the transmit/receive switch.

In instances where the transmit/receive switch 124 is positioned on or connected to the wireless headset 108, the headset 108 may be configured to wirelessly transmit a signal representative of an engagement of the transmit/receive switch 124 to the wireless adapter 118, or, alternatively, to the communications device 102. Upon receipt of the signal representation of the engagement of the transmit/receive switch 124, the wireless adapter 118 may provide a corresponding signal to the communications device 102 to cause the communications device 102 to enter a transmit mode for the subsequent audio information provided from the headset 108.

Referring to FIG. 1B, an alternative implementation of a transmit/receive switch feature is illustrated as system 100B. Rather than, or in addition to, a transmit/receive switch positioned on the headset 108 or the wireless adapter 118, in one embodiment a wireless transmit/receive switch assembly 130 may be employed to provide a PTT-type transmit mode indication. Accordingly, the transmit/receive switch assembly 130 may be located in any of a number of useful locations within range of the communications device 102 without requiring one or more wires that may become entangled or otherwise hinder the user 110. In the illustrated example, the transmit/receive switch assembly 130 includes a transmit/receive switch 132 that may be engaged by the user 110 to indicate that audio information is to be transmitted, a power supply such as a battery (not shown) and processing hardware and software adapted to wirelessly transmit a PTT-type transmit mode indication to the wireless adapter 118 or the communications device 102 via, for example, an antenna or transducer 134 when the user 110 engages the transmit/receive switch 132. The transmit/receiver switch assembly 130 may also include a speaker and receive audio information from the wireless adapter 118 for output through the speaker. The transmit/receiver switch assembly 130 may also include a microphone and transmit audio information to the wireless adapter 118 from the microphone.

Moreover, in at least one embodiment, the headset 108 may be configured to receive the transmit mode signal from the transmit/receive switch assembly 130 to determine whether the transmit/receive switch 134 has been engaged. If not engaged, the headset 108 may forgo the transmission of any audio information input by the microphone assembly 114 to minimize power consumption and/or to minimize or eliminate unintended transmissions such as, for example, when the user 110 is talking but does not intend to transmit via the communications device 102.

In addition to implementing a transmit/receive switch to enable a PTT-type functionality, the headset 108 may further be VOX enabled and therefore may implement a VOX-PTT switch to enable the user 110 to switch between VOX-type transmission handling and PTT-type transmission handling.

Referring to FIG. 1C, another exemplary embodiment of the headset 108 is illustrated. In the exemplary system 100C, a wireless microphone assembly 144 may be used to input and communicate audio information from the user 110 to the communications device 102. The wireless microphone assembly 144 preferably is adapted to detect and convert audio signals into a corresponding electrical signal and wirelessly transmit an analog or digital form of the electric signal to the adapter 118 or the communications device 102. The wireless microphone assembly 144 may include any of a variety of attachment mechanisms, such as straps, hook-and-loop fasteners, adhesives, magnets, etc., so that the wireless microphone assembly 144 may be fastened or otherwise positioned on or in proximity to the user 110. For example, as illustrate, the wireless microphone assembly 144 may implement a throat microphone placed in contact with the throat of the user 110 using one or more straps.

Figure 2B:
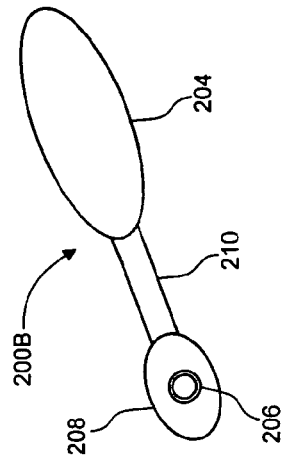
FIGS. 2A-2G are schematic diagrams illustrating exemplary placements of a transmit/receive switch in conjunction with a wireless headset in accordance with at least one embodiment of the present invention.
Figure 2C:
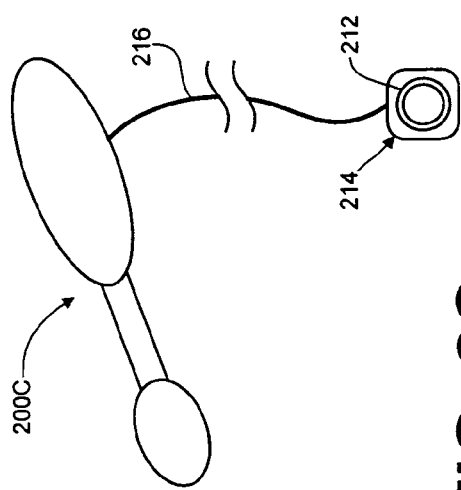
Figure 2A:
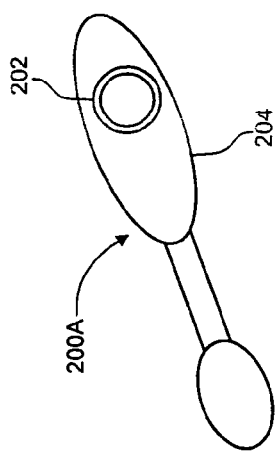

Referring now to FIGS. 2A-2E, various exemplary configurations of the wireless headset 108 are illustrated in accordance with at least one embodiment of the present invention. FIG. 2A illustrates a wireless earbud-type or earclip-type headset 200A wherein a transmit/receive switch 202 is positioned on a body 204 of the headset 200A. In this instance, the transmit/receive switch 202 preferably is positioned to be substantially coaxial with the ear canal (not shown) of the user 110 to prevent excess torque from moving the headset 200A or causing the headset 200A to twist out of the user's ear. However, in some instances, the placement of the headset 200A may be relatively secure and/or the transmit/receive switch 202 may be relatively sensitive to touch (e.g., a capacitive button) such that the transmit/receive switch 202 may be positioned elsewhere on the body 204, such as, for example, on the top, side, or bottom of the body 204.

FIG. 2B illustrates a wireless earbud-type or earclip-type headset 200B wherein a transmit/receive switch 206 is positioned on a microphone assembly 208, where the microphone assembly 208 may be connected to the body 204 via a boom 210. In such instances, a transmit/receive switch 206 relatively sensitive to touch preferably is employed so that a minimum amount of force may be employed by the user 110 to engage the transmit/receive switch 206.

Rather than positioning the transmit/receive switch directly on the headset, FIG. 2C illustrates an exemplary embodiment wherein a transmit/receive switch 212 is implemented as part of a transmit/receive switch assembly 214 connected to the main portion of an earbud-type or earclip-type headset 200C via at least one wire lead 216 which may be used to signal the headset 200C when the transmit/receive switch 212 is engaged. The transmit/receive switch assembly 214 may be clipped to some object on the user 110, such as, for example, a collar of the user's shirt or a helmet or hat worn by the user.

Although FIGS. 2A-2C depict exemplary configurations of a transmit/receive switch on a wireless headset 108, the present invention is not limited to these configurations. To illustrate, in one embodiment, the transmit/receive switch may be positioned on an interior side of the headset 108 and placed in contact with, or next to, the face or ear of the user 110 such that when the user 110 places pressure on the distal side of the headset 108, the headset 108 is pressed closer to the face or ear of the user 110, thereby engaging the transmit/receive switch. As another example, the speaker of the headset 108 may be implemented as a ear piece that is inserted in or near the ear canal of the user 110 (as illustrated with reference to FIGS. 8A-8D) and the transmit/receive switch may be integrated into the connection between the ear piece and the body of the headset 108 such that when the user 110 places pressure on the body of the headset 108 in the direction of the user's head, the connection is compressed, thereby engaging the transmit/receive switch. Using the guidelines provided herein, those skilled in the art may implement various transmit/receive switch positions and configurations without departing from the spirit or the scope of the present invention.

Figure 2E:
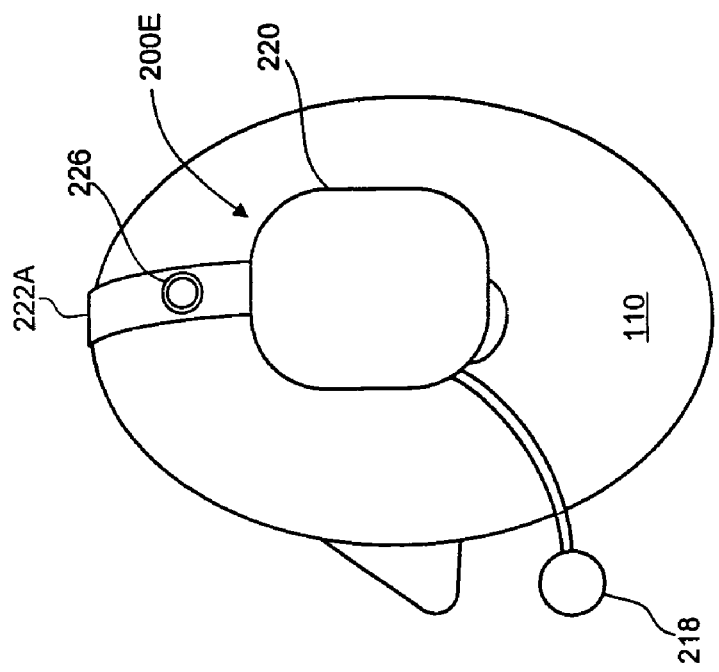
Figure 2D:
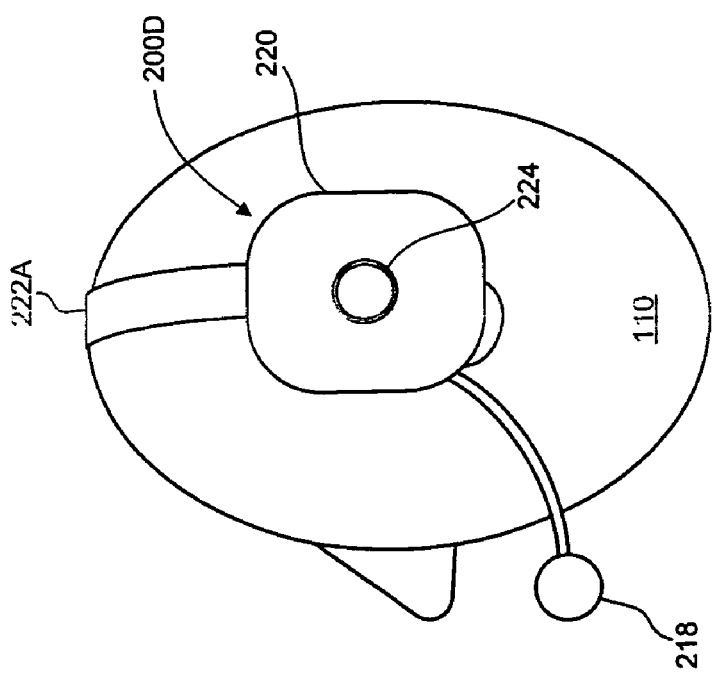
Figure 2G:
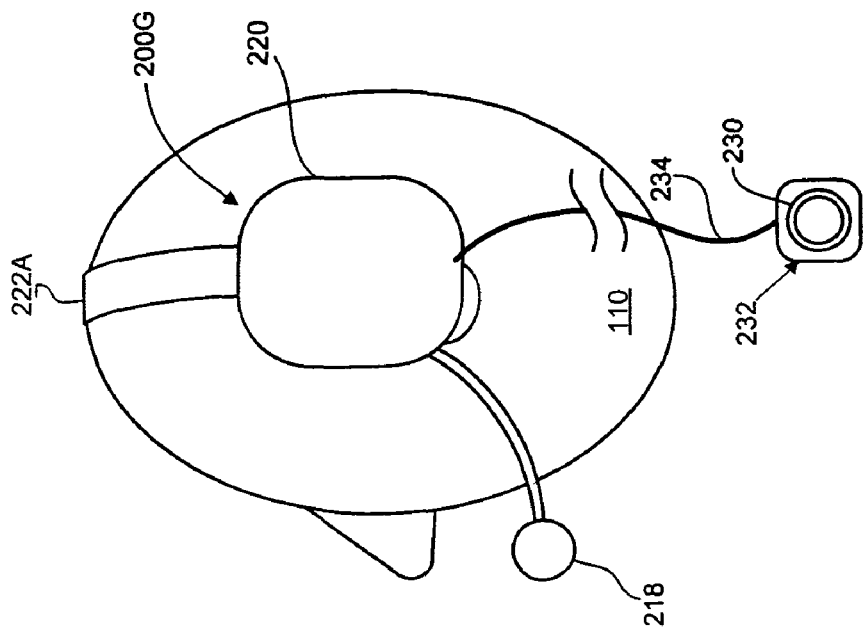
Figure 2F:
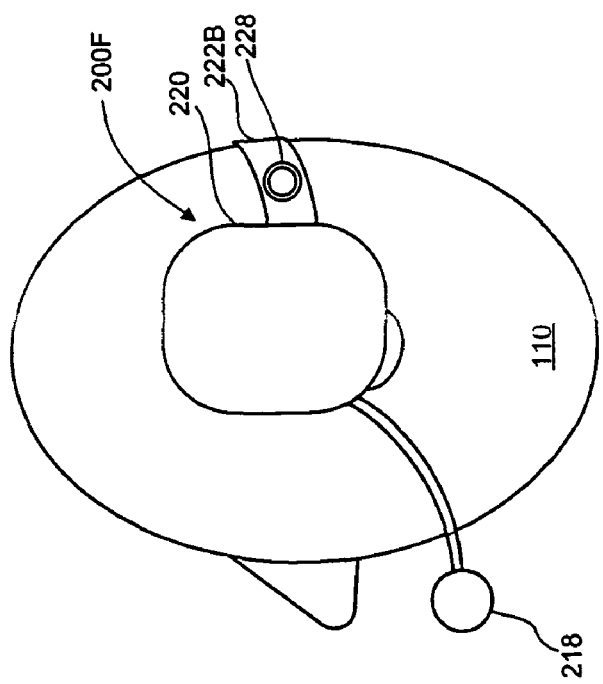

As illustrated in FIGS. 2D-2G, the wireless headset 108 alternatively may be implemented as a headband-type headset having a microphone assembly 218 one or two earpads 220 connected via one or more headbands 222A or 222B that may be positioned over and/or behind the head of the user 110. FIG. 2D illustrates an exemplary headband-type headset 200D wherein a transmit/receive switch 224 may be positioned on the earpad 220. However, because the earpad 220 is larger and more secure than the earbud-type microphones described above, a more substantial transmit/receive switch may be used, as it is less likely that the user 110 is likely to dislodge the earpad 220 when engaging the transmit/receive switch 224. FIG. 2E illustrates an exemplary headband-type headset 200E wherein a transmit/receive switch 226 is positioned on a headband 222A secured over the top of the user's head. Similarly, FIG. 2F illustrates an exemplary headband-type headset 200F wherein a transmit/receive switch 228 is positioned on a headband 222B secured behind the user's head. FIG. 2G illustrates an exemplary headband-type headset 200G wherein a transmit/receive switch 230 is implemented as part of a transmit/receive switch assembly 232 and operably connected to the main portion of the headset 200G via one or more wire leads 234.

Figure 3:
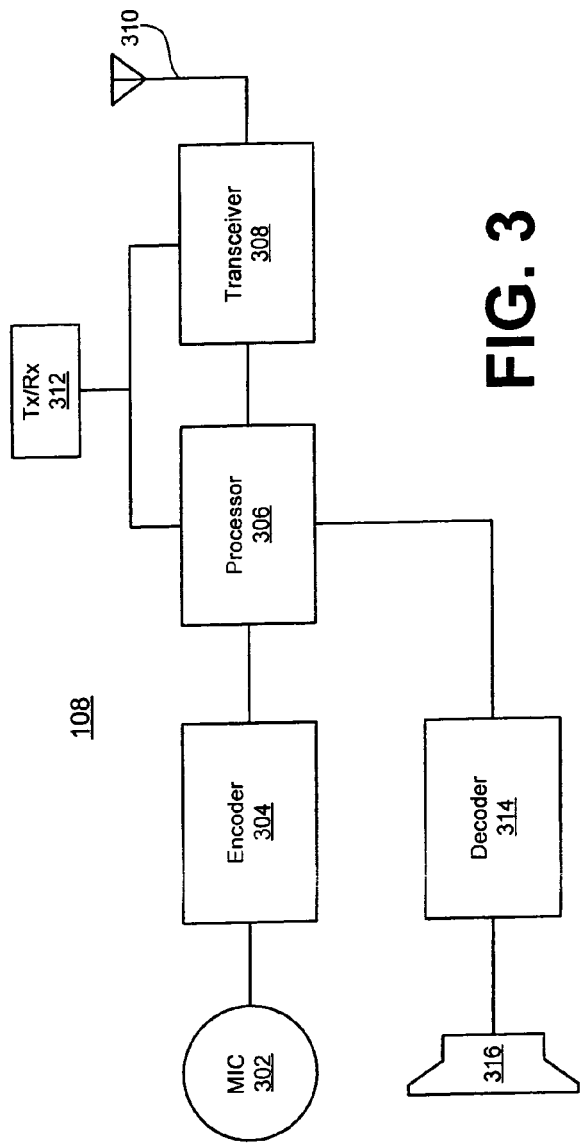
FIG. 3 is a schematic diagram of an exemplary wireless headset in accordance with at least one embodiment of the present invention.

Referring now to FIG. 3, an exemplary functional implementation of the wireless headset 108 is illustrated in accordance with at least one embodiment of the present invention. In the illustrated example, audio information and other information may be transmitted from and received by the headset 108 in a packetized form. Accordingly, audio information from the user 110 (such as vocalizations from the user 110) are received by a microphone assembly 302 and converted to a representative analog signal. The analog signal is digitized by an encoder 304 and the digital information is provided to one or more processors 306 for packetization as well as other processing as appropriate (such as, for example, filtering, adjusting the gain, encrypting the data, etc.). Alternatively, the audio information may be input by the wireless microphone assembly 144 (FIG. 1C) and a wireless signal representative of the audio information may be transmitted from the wireless microphone assembly 144 to the headset 108 or the adapter 118 in an analog or digital form.

In one embodiment, the packetization process includes segmenting the digital information by a certain number of bits (e.g., sixteen bits) and forming a packet for each segment by proceeding the segment with a training bit sequence and/or an authorization code so that the communications device 102 may correctly identify the packet. The packet then may be transmitted to the communications device 102 via a transceiver 308 and an antenna or transducer 310. In at least one embodiment, the transceiver and antenna 310 operate in one or more of the 800 megahertz (MHz), 900 MHz or 2.4 gigahertz (GHz) frequency bands, although other operating frequencies may be utilized as appropriate. For example, the transceiver and transducer 310 communicate over a magnetic induction link or the present invention may advantageously implement one or more ultrawide band (UWB) mechanisms to wirelessly transmit information between one or more components.

As noted above, the wireless headset 108 preferably is implemented with a half-duplex communications device 102 (FIGS. 1A and 1B) wherein a PTT-type transmit mode indication is used to direct the communications device 102 to enter a transmit mode. Accordingly, in at least one embodiment, the transmit/receive switch 312 is operably connected (e.g., wirelessly, by conductive wire, by optical fiber, etc.) to the processor 306 or the transceiver 308, whereby the processor 306 or the transceiver 308 may be activated for the packetization and transmission of audio information only when the transmit/receive switch 312 is engaged to minimize power consumption as the transmission of packetized audio information from the headset 108 typically is of little use when the communications device 102 is not in a transmit mode. In instances wherein the transmit/receive switch 312 is wirelessly connected to the headset 108 (e.g., transmit/receive switch assembly 130 of FIG. 1B), a signal representative of the engagement of the transmit/receive switch 312 may be received via the antenna or transducer 310 and transceiver 308 or a separate antenna or transducer and/or transceiver may be implemented to receive this signal.

Packetized audio information transmitted from the wireless adapter 118 (FIGS. 1A and 1B) or directly from the communications device 102 is received via the antenna or transducer 310 and transceiver 308, depacketized by the processor 306 and provided to a decoder 314 for conversion to an analog signal representative of the audio information. The analog signal then may be used to drive a speaker 316 to output the audio information as sound for detection by the user 110. As discussed above, the speaker 316 may be implemented in a earbud or ear insert placed in or near to an ear canal of the user 110, in an earpiece of the headset which covers at least a portion of the ear, and the like.

Although an exemplary implementation of the headset 108 using digital transmission techniques is described above, other known analog or digital transmission techniques may be implemented to communicate information between the headset 108, the wireless adapter 118 and/or a wireless transmit/receive switch assembly without departing from the spirit or the scope of the present invention. To illustrate, one or more of the headset 108, the wireless adapter 118/communications device 102 and the transmit/receive switch assembly 130 may be enabled to communicate in accordance with one or more BLUETOOTH® wireless communications standards.

Referring now to FIG. 4, an exemplary implementation of the wireless adapter 118 is illustrated in accordance with at least one embodiment of the present invention. In the illustrated example, the wireless adapter 118 includes an antenna or transducer 402, a transceiver 404, one or more processors 406, a decoder 408 and an encoder 410. Although the adapter 118 is illustrated and described as separate from the communications device 102 for ease of discussion, in at least one embodiment, the adapter 118 is integrated into the communications device 120 (i.e., as a module added to the overall design). Where the adapter 118 is integrated into the communications device 120, the communication device 120 may include a bypass switch that operates in a manner similar to the power switch of the adapter 118. The bypass switch functions to disable the adapter 118. The bypass switch may also activate a speaker or microphone present in the communications device 120 and required for communication when a auxiliary headset is not used. Accordingly, the following description applies to both a separate adapter 118 or an integrated adapter 118 unless otherwise noted.

As discussed above, in at least one embodiment, audio information or other information may be transmitted between the wireless adapter 118, the headset 108 and/or the transmit/receive switch assembly 130 as packetized digital information. Accordingly, packetized digital information from the headset 108 or transmit/receive switch assembly 130 may be received by the antenna or transducer 402 and depacketized by the transceiver 404 or processor 406. The processor 406 may further process the information (e.g., analyze the access code associated with a packet to determine whether to continue processing the packet) and provide the information to the decoder 408, whereupon it may be converted from digital to analog form. The analog signal representing the information then may be provided to the communications device 102 via an interface 412.

Conversely, audio information and other information from the communications device 102 may be provided to the encoder 410 via the interface 412 for conversion from an analog form to a digital form. The digital information then may be provided to the processor 406 for packetization and additional processing, and the packets of information may be transmitted for reception by the headset 108 via the transceiver 404 and antenna or transducer 402. Although wireless communications between the headset 108, adapter 118 and/or the wireless transmit/receive switch assembly 130 may be conducted at any suitable frequency or frequency band. For example, conventional radio transmissions may utilized in the 800 megahertz (MHz), 900 MHz, and 2.4 gigahertz (GHz) bands. Ultra wide band transmission may used in frequencies up to 9 gigahertz, typically in the 3-7 GHz range. Magnetic induction may be used in the frequencies below 50 megahertz (MHz) typically in the range of 10 MHz to 15 MHz.

The interface 412 may include any of a variety of interfaces typically used to connect the communications device 102 to a conventional wired headset and wired PTT button. For example, the interface 412 may include, but is not limited to, any of the following: an Assembled HT1000 Style Accessory Interface, an Assembled HT750/HT1250 Style Accessory Interface, a 3.5 mm Threaded Plug Accessory Interface or a 6-pin Hirose Accessory Interface, a 2.5/3.5 mm Right Angle Overmolded Accessory interface, all of which are frequently used on a number of MOTOROLA two-way radios; a 2.5 mm accessory and data cable connector input jack frequently used on cellular telephones such as the MOTOROLA i60C; and interfaces for the Motorola Saber, M/A-COM P7100 Series, the Kenwood TK-280/Tk-380, Thales MBITR series, the Harris RF5800V Series, the Vertex VX-800 series, the Icom F43 series and the Tait ORCA series; and the like.

In an alternate embodiment, communications between the headset 108 and the adapter 118 are conducted by way of two or more separate channels in a spread spectrum, at least one channel for transmitting audio and other information from the wireless adapter 118 and at least one other channel for transmitting audio and other information from the headset 108. Moreover, one or more UWB techniques, or similar techniques, may be implemented.

Rather than, or in addition to, receiving a wireless signal from the headset 108 or the wireless transmit/receive switch assembly 130 that indicates that the user 110 has engaged a transmit/receive switch, the adapter 118 may implement a transmit/receive switch 414 which may be engaged by the user 110 to a PTT signal to be submitted to the communications device 102 via the interface 414 either directly or via the processor 406.

Figure 5:
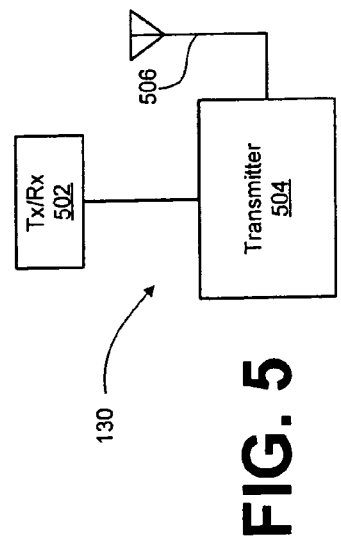
FIG. 5 is a schematic diagram of an exemplary wireless transmit/receive switch assembly in accordance with at least one embodiment of the present invention.

Referring now to FIG. 5, an exemplary implementation of the wireless transmit/receive switch assembly 130 is illustrated in accordance with at least one embodiment of the present invention. In the illustrated example, the transmit/receive switch assembly 130 comprises a transmit/receive switch 502, a transmitter 504 and an antenna or transducer 506. The transmitter 504 may include a processor/transceiver combination as described above, or the transmitter 504 may include an analog or digital design, or combination thereof, suitable to transmit a signal that indicates to the communications device 102 that audio information is to be transmitted. The signal may include an actual transmitted signal that represents the engagement of the transmit/receive switch 502 or the signal may be represented by a cessation of a transmitted signal, where the cessation indicates that the transmit/receive switch 502 has been engaged.

The communications link between the transceiver 308 of the headset 108, as shown in FIG. 3, and transceiver 404, of the adapter 118, as shown in FIG. 4, typically operates over relatively short distances of the order of two meters or less. This is due to the fact that communications device 120 is kept in close proximity, for example worn by a belt attachment, to the headset 108, worn on the user's head. Various specialized communications methods are well suited for this short range communications. UWB communications are well suited to this application. As the transmission distance is small, a low power UWB signal may be used. The data is thus transmitted at low power and spread over a very wide frequency band. Such a signal is very hard to detect as the data is virtually indistinguishable from noise at any discreet frequency particularly at the low powers required for short distance transmissions. The UWB transmission is also immune to specific interference making it a very reliable communications technique. Accordingly, communications between the headset 108 and adapter 118 using low power UWB signals is a secure and reliable form of communications.

Magnetic induction communications is another communications technique particularly suited for this short range communication link. Magnetic induction link transceivers providing this communication link are available from Aura Technologies of Wilmington, Mass. By using a near field magnetic induction link, information is communicated by modulating a non-propagating quasi-static magnetic field. As the magnetic field is not propagated, the information is only communicated within the relatively small local region around the transducer. The power roll off is extremely steep with near field magnetic induction. This large roll off is particularly advantageous for secure short range communications. The strong attenuation over a short distance ensures that communications are not propagated to unauthorized receivers. In effect, a small, private and secure operational bubble is created. The magnetic field is also largely unaffected by the surroundings including conductive objects and people that may interfere with traditional radio transmissions. The secure operational bubble thus also provides exceptionally reliable communications. The transducer 310 of the headset 108 and the transducer 402 and the transceiver 404 must be maintained within the proximity of this operational bubble to modulate a magnetic field that may be sensed by the other transducer. This operational bubble typically is about two meters. The short range of the operational bubble also prevents congestion on the frequencies used for communication. The magnetic induction link operates well at frequencies lower than 50 MHz such as from 10 MHz to 15 MHz. Accordingly, this headset 108 and adapter 118 communicate within the industrial, medical, and scientific band at 13.5 MHz and 13.9 MHz. As information is not propagated over a significant distance, the quasi-static magnetic field also requires relatively low power to operate. The power transmitted over the magnetic induction link is easily limited less than one microwatt and typically is in the range of 100 nanowatts. Where a separate switch assembly 130 is utilized as shown in FIG. 5, the transmitter 504 and transducer 506 communicate over the magnetic induction link.

One advantage of communication over a magnetic induction link is that the magnetic field is relatively stable helping to ensure reliable communication. The magnetic field created by headset 108 must be sensed by adapter 118 and vice versa for the communications link to be established. Accordingly, when a distance greater than the small range operational bubble separates the headset 108 and adapter 118, the absence of the magnetic induction link is readily determined. In such circumstances, the user can be warned that the communications link has been broken. This warning may be audible or visual. For example, processor 306 in headset 108 may determine that the magnetic induction link has been broken between transceiver 306 and transceiver 404. The processor 306 warns user 110 by causing speaker 316 to output an audible tone. Similarly, processor 406 may determine that the magnetic link has been broken and cause an indicator lamp at the communications device 120 to be lit. Similarly, an indication may be output when the communications link is established to confirm that the wireless headset is operational.

The small operational bubble provides reliable communications. The small bubble ensures that the bandwidth is readily reused by other apparatus also using magnetic induction communications. Thus, many systems of the present invention may operate in relatively close proximity. Should two users of separate systems 100 of the present invention approach one another such that the components of one system encroach into the operational bubble of the other, some interference may occur degrading the performance of the magnetic induction link. This interference may be mitigated by automatically shifting frequencies when interference is detected. For example, upon detecting interference, processor 306 may cause transceivers 308 and 404 to shift from modulating on 13.5 MHz to modulating on 13.9 MHz.

Another advantage of communication over a magnetic induction link is the ability to effectively manage power. The magnetic field of the magnetic induction link is relatively low power as the communications distance are short. Thus, transducers 310, 402, and 506 require relatively low power to operate. However, at very short ranges significant energy may be transferred over the magnetic induction link. Accordingly, adapter 118 may transfer power for operating headset 108 or transmit/switch assembly 130 over the magnetic induction link. Typically, batteries are used to provide operational power headset 108 and switch/assembly 130. The magnetic induction link may be used to transfer the energy required during a battery recharging operation where the headset 108 or switch/assembly 130 are placed in close proximity. In circumstances requiring very low power for operation, operational power may be provided directly from the magnetic induction link. For example, where transmit/switch assembly 130 includes only a PTT switch that is typically worn close to the adapter 118, the adapter 118 may provide operational power to the transmit/switch assembly 130 over the magnetic induction link during operation.

Another power management feature derives from the ability to detect the magnetic induction link regardless of whether the link is communicating information. As discussed above, this feature allows the system to detect when the magnetic induction link is broken. The magnetic induction link is broken when the two transducers are not in sufficient proximity to detect the magnetic field generated by the other. The magnetic induction link may also be broken by disabling one of the transducers. This feature may used to conserve power. The processor 306 of headset 108 may detect when the magnetic induction link is broken. Upon passage of a predetermined period of time, such as five minutes, with the link remaining broken, the processor 306 shuts down the headset 108 as a power conservation feature.

A further advantage of communication over a magnetic induction link is its enhanced security. As noted above, the communication may be digital communications. The magnetic induction link is used to communicate audio information, such as the voice of the user, from the headset 108 to the adapter 118 for transmission by communications device 120. The magnetic induction link is used to communicate audio information received by the communications device 120 to the headset 108 for output by the speaker 316 to the user 110. The magnetic induction link is also used to transmit data, such as the PTT signal from headset 108 or switch assembly 130 to adapter 118. For security, all of this digital information is encrypted. Additionally, the information stays within the short range operational bubble. The processor 306 may dynamically adjust the power of the transducer 308. The size of the operational bubble may thus be scaled to ensure that is no larger than required to ensured that the adapter 118 is within range. Of course, if the headset 108 and adapter 118 are separated by more than the maximum range of the operational bubble, the magnetic link will be broken and the user may be warned as discussed above.

Further security is provided by a pairing process that ensures that the headset 108 can only communicate a designated adapter 118. The paring process is initiated by the user prior to the initial use of a headset 108 with a communications device 102. Pairing may be initiated by manipulating buttons on the headset 108. For example holding both a volume up button and a volume down button 6 seconds may initiate the pairing process. The headset 108 initiates the pairing process by temporarily reassigning a unique 16-bit identifying address to a general universal address. When the adapter 118 is in range of the headset during this process, it will also temporarily reassign its unique 16-bit identifying address to the universal address. Unsecured, the devices will exchange information to ensure that valid communication is taking place. At this time, the headset 108 will generate a random, unique 16-bit address and transmit this address to the adapter 118. Both devices are then assigned this new unique address and once again exchange information to confirm that valid communication can occur. This unique address is then saved into non-volatile memory associated with processor 306 and processor 406. The identifying address is required for all future communications between headset 108 and adapter 118.

Figure 6:
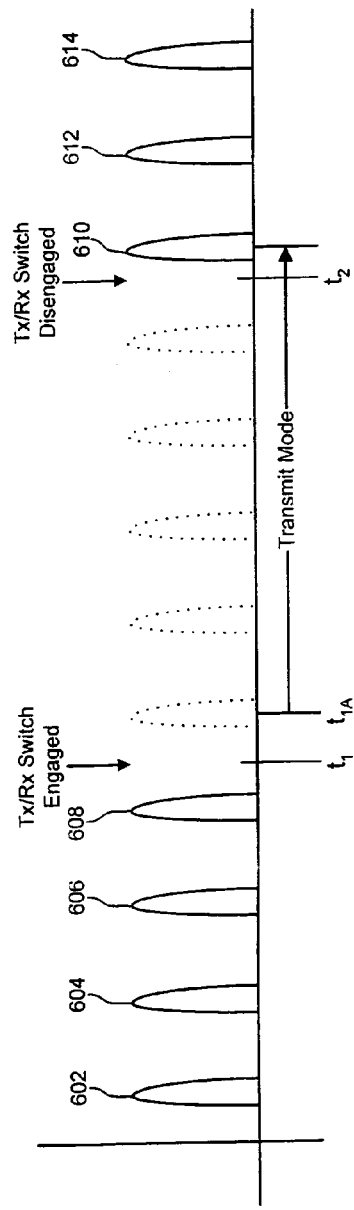
FIGS. 6 and 7 are diagrams illustrating exemplary push-to-talk engagement techniques in accordance with at least one embodiment of the present invention.
Figure 7:
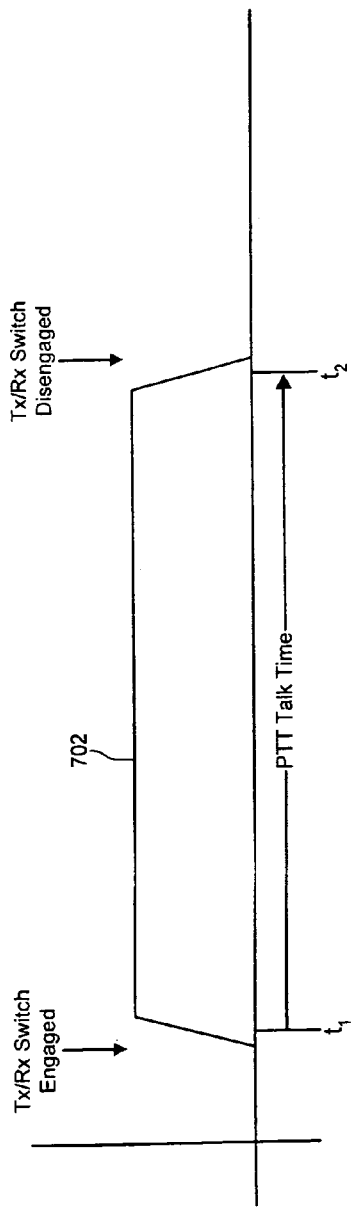

Referring now to FIGS. 6 and 7, exemplary methods 600 and 700, respectively, for providing a signal representative of an engagement of a transmit/receive switch are illustrated. The methods 600 and 700 may be implemented by the headset 108 to indicate its transmit/receive switch 124 (FIG. 1) has been engaged or may be implemented by the wireless transmit/receive switch assembly 130 to indicate that its transmit/receive switch 132 has been engaged. For ease of discussion, the exemplary methods 600 and 700 are described as applied by the wireless transmit/receive switch assembly 130.

In the illustrate example of FIG. 6, a periodic transmission of chirps (e.g., chirps 602-614) by the transmitter 504 indicate that the transmit/receive switch 502 has not been engaged. The chirps may include, for example, a transmission burst at a particular frequency and for a particular duration, a particular signal pattern, or a particular digital sequence that is identified by the processor 406 (FIG. 4) of the wireless adapter 118 as being a signal chirp from the transmit/receive switch assembly 130.

When the transmit/receive switch 502 is engaged (e.g., at time $t_1$), the transmitter 504 may be configured to cease the transmission of periodic chirps until the transmit/receive switch 502 is disengaged (e.g., at time $t_2$). Accordingly, the processor 406 (and/or the processor 306 of the headset 108) may be configured to note the cessation or absence of an expected chirp at time $t_{1A}$ as an indication or signal that the transmit/receive switch 502 is engaged and therefore signals the communications device 102 to enter a transmit mode by, for example, providing a conventional PTT signal to the communications device 102 via the interface 412 (FIG. 4). The adapter 118 may continue to provide the signal or indication to the communications device 102 until the transmission of chirps is resumed after time $t_2$.

Alternatively, as illustrated in FIG. 7, the transmitter 504 may be adapted to transmit a signal 702 while the transmit/receive switch 502 is engaged (e.g., between times $t_1$ and $t_2$) and cease transmitting the signal 702 once the transmit/receive switch 502 is disengaged. In this instance, the wireless adapter 118 may provide, for example, a conventional PTT signal to the communications device 102 via the interface 412 for the duration that the signal 702 is received at the wireless adapter 118 so that the communications device 102 enters a transmit mode for this duration.

Figure 8A:
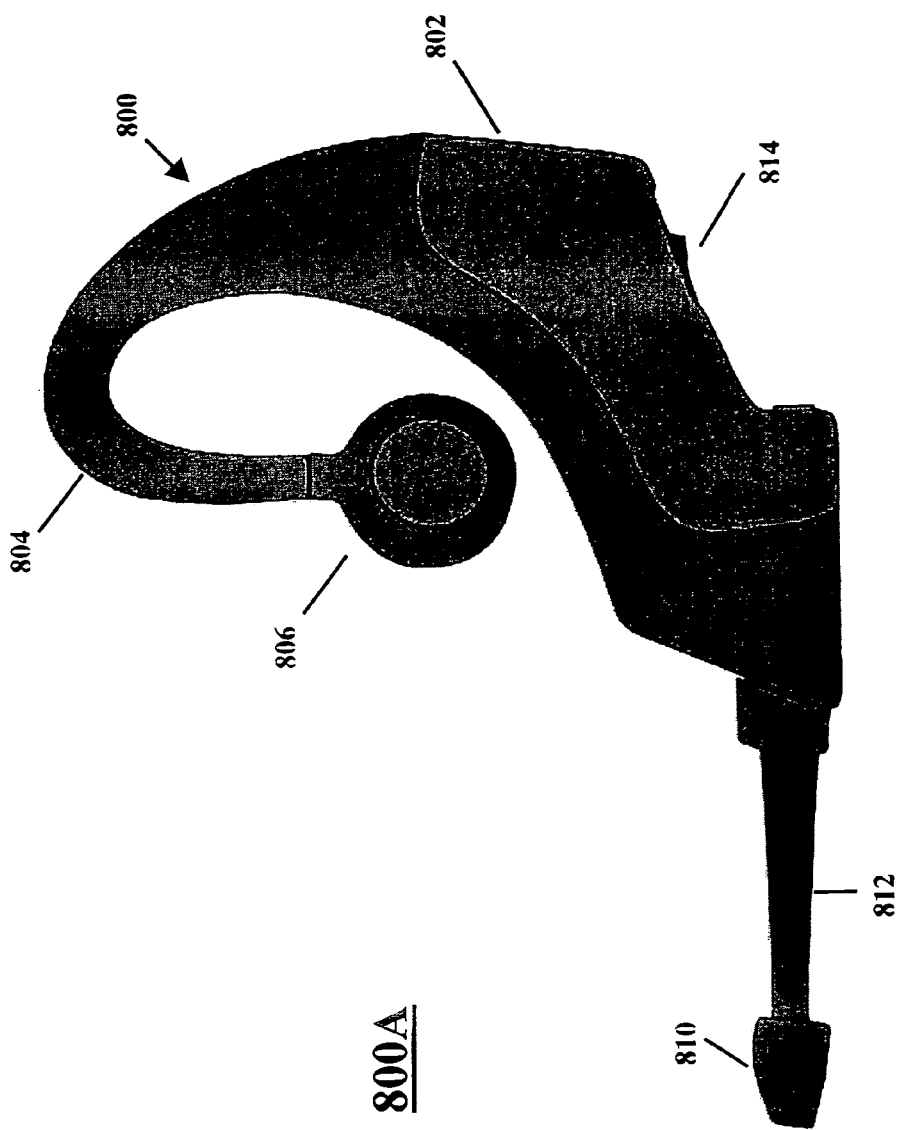
FIGS. 8A-8D are perspective views of an exemplary implementation of a wireless headset in accordance with at least one embodiment of the present invention.

Referring now to FIGS. 8A-8D, another exemplary implementation of the wireless headset 118 (depicted as headset 800) is illustrated in accordance with at least one embodiment of the present invention. FIG. 8A depicts a side view 800A of the headset 800, wherein the headset 800 includes a main body 802 mounted to user's ear by way of an ear clip section 804. The ear clip section 804 terminates at a earpiece 806 having an ear insert (see FIGS. 8B and 8C) on one side and a transmit/receive switch 808 on the other such that the transmit/receive switch 808 is substantially coaxial with the ear insert and therefore is substantially coaxial with the ear canal of the user's ear. The main body 802 is further connected to a microphone assembly 810 by way of a boom 812. The main body 802 also may include a VOX/PTT switch 814 that may be operated by a user to switch the headset 800 between a PTT-based mode and a VOX-based mode.

Figure 8B:
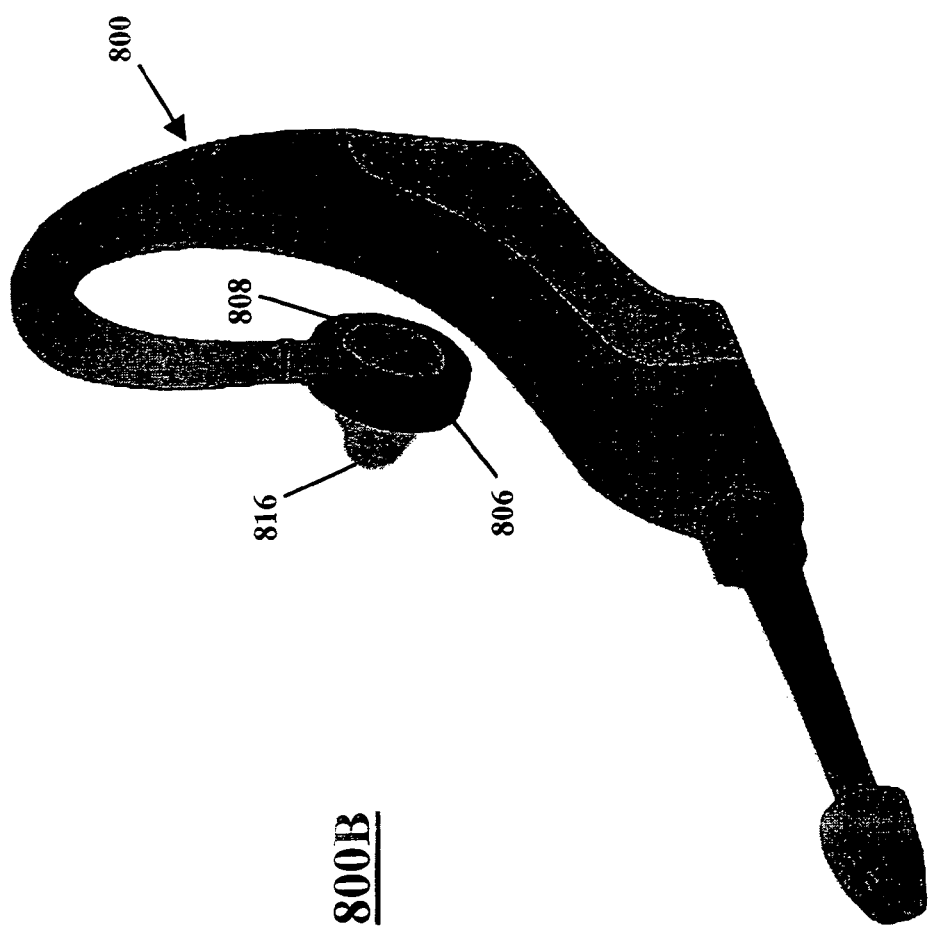
Figure 8C:
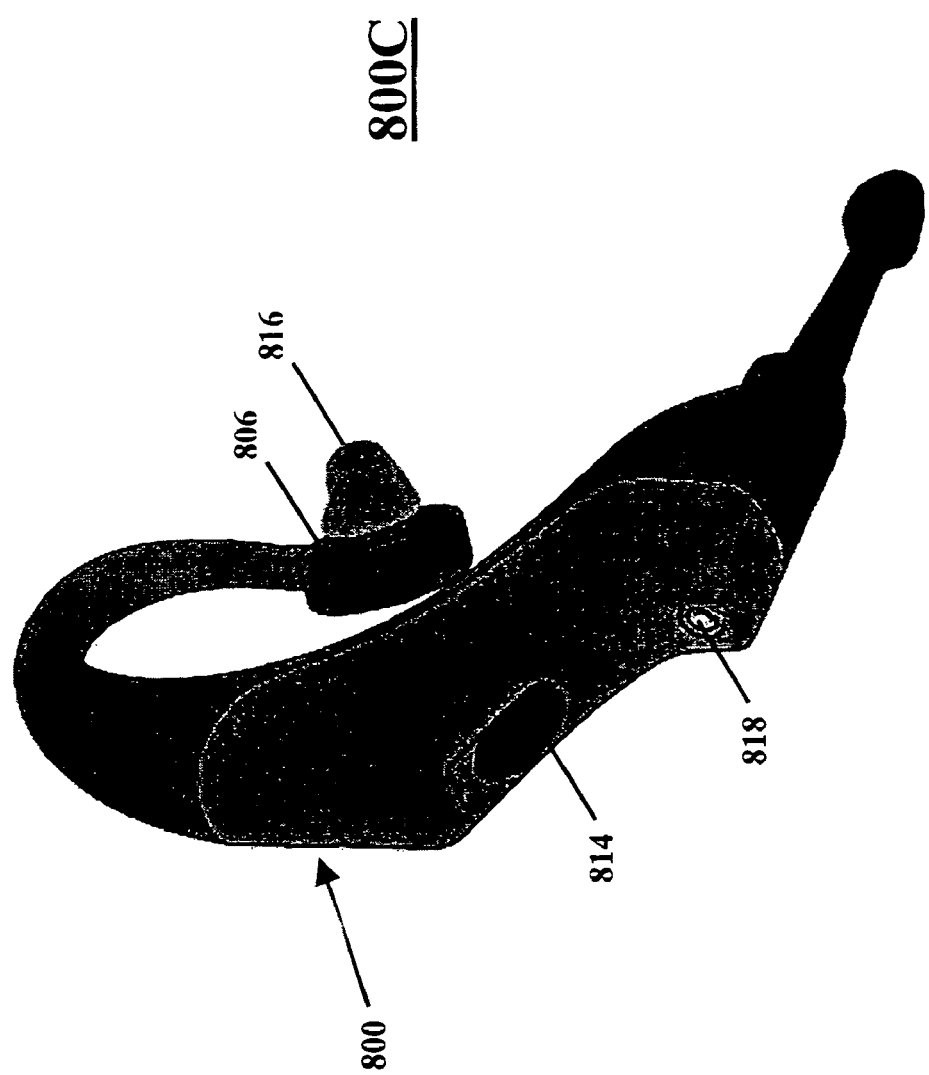
Figure 8D:
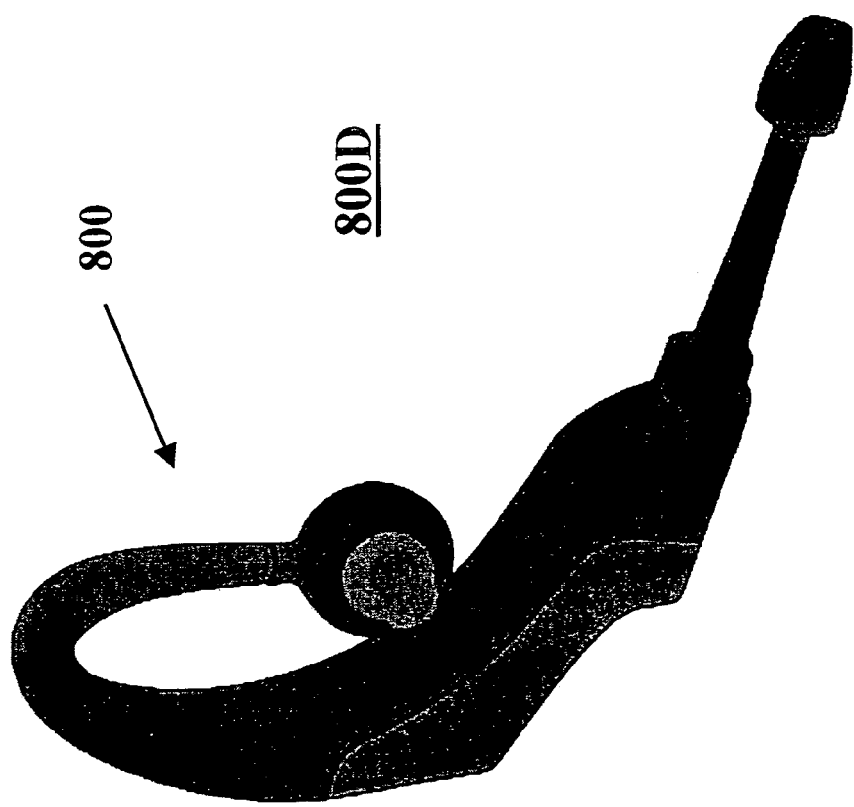

FIG. 8B depicts a front perspective view 800B of the headset 800. As illustrated, the earpiece 806 includes an ear insert 816 on one side and the transmit/receive switch 808 on the other side. The ear insert 816 may comprise conforming gel or other elastic or semi-elastic material that forms to the contours of the user's ear canal to ensure a more secure fit. Commercial implementations of suitable ear inserts 816 include, for example, JABRA EarGels® or JABRA Mini-Gels™ available from JABRA Corporation of Copenhagen, Denmark. FIG. 8C depicts a bottom perspective view 800C of the headset 800. As illustrated, the headset 800 may implement a power supply jack 818 to recharge one or more batteries (not shown) used to power the headset 800. FIG. 8D depicts a bottom perspective view 800D of the headset 800.

Figure 9:
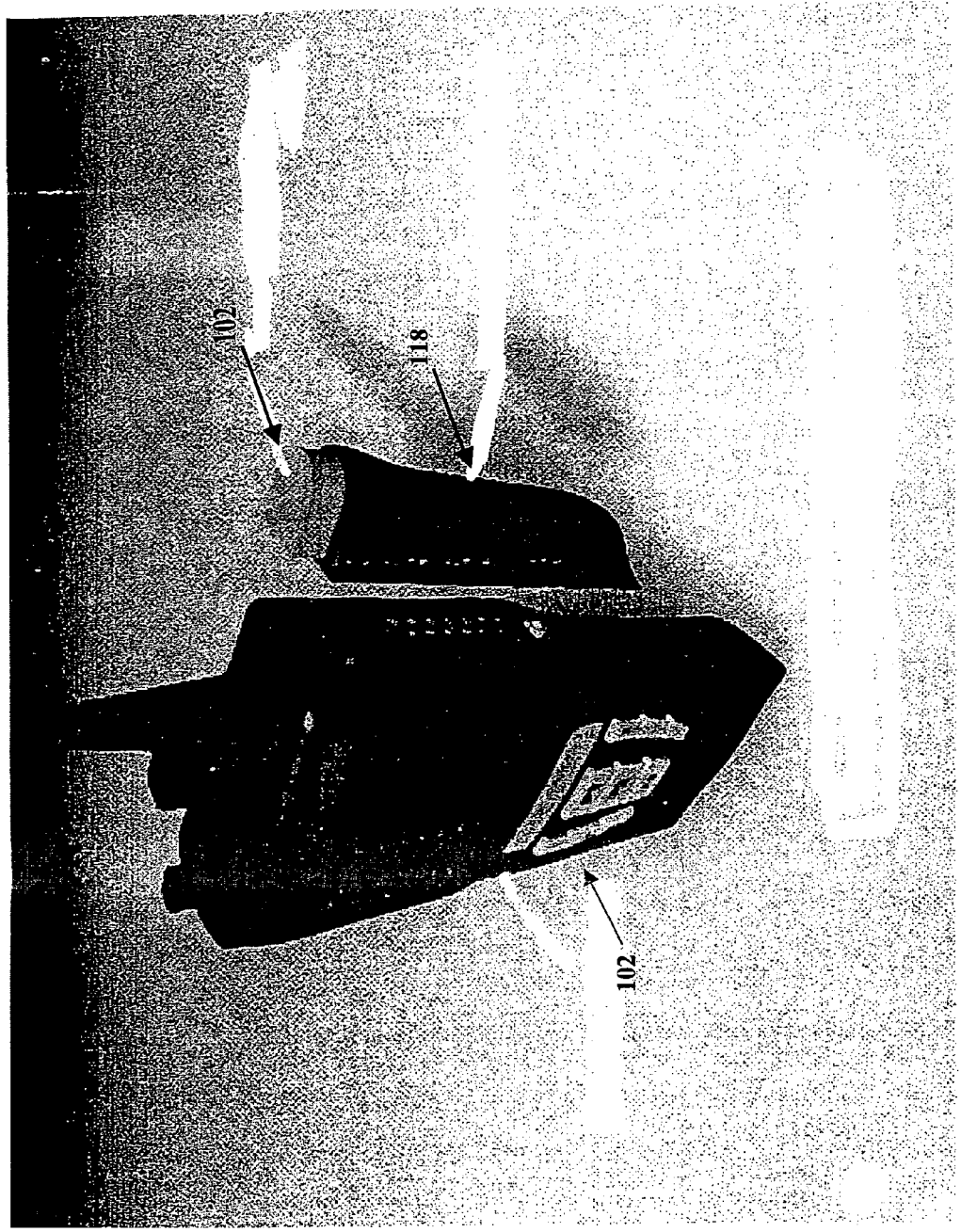
FIG. 9 is a perspective view of an exemplary implementation of a wireless adapter in accordance with at least one embodiment of the present invention.

Referring now to FIG. 9, an exemplary implementation of the wireless adapter 118 and communications device 102 is illustrated. As depicted, the adapter 118 may include a transmit/receive switch 902 (a button in the illustrated example) which may serve as a backup to a transmit/receive switch on the wireless headset 108 (FIG. 1A) or the wireless transmit/receive switch assembly 130 (FIG. 1B). The adapter 118 may be affixed to the communications device 102 (e.g., a two-way radio in the illustrated example) via set screws, VELCRO®-type hook and loop fasteners, straps, adhesive, clamps and the like. Alternatively, the wireless adapter may be operably connected to the communications device 102 via one or more conductive or optic wires so that the wireless adapter 118 may be positioned closer to the wireless headset 108.

Other embodiments, uses, and advantages of the invention will be apparent to those skilled in the art from consideration of the specification and practice of the invention disclosed herein. The specification and drawings should be considered exemplary only, and the scope of the invention is accordingly intended to be limited only by the following claims and equivalents thereof.

What is claimed is:

1. A wireless device for use with a half-duplex wireless communications device, the wireless device comprising:
   a microphone assembly adapted to receive audio information from a user;
   a switch; and
   an induction transceiver adapted to wirelessly transmit at least one signal through a magnetic induction link to one of the half-duplex wireless communications device and an adapter coupled to the half-duplex wireless communications device,
   wherein the at least one signal wirelessly transmitted through the magnetic induction link comprises information indicating a status of the switch and information representative of at least a portion of the audio information received at the microphone,
   wherein, if the information indicating the status of the switch indicates that the switch is engaged, the information indicating that the switch is engaged is used to control the half-duplex wireless communications device to enter a half-duplex transmission mode for the half-duplex wireless communications device to wirelessly communicate the at least a portion of the audio information to another wireless communications device, and
   wherein a disengagement of the switch does not prevent the at least one signal wirelessly transmitted by the induction transceiver from comprising the information representative of at least a portion of the audio information.

2. The wireless device as in claim 1, wherein the switch is positioned on the microphone assembly.

3. The wireless device as in claim 1, wherein the magnetic induction link is a near field magnetic induction link operating over a short range, thus forming a small operational bubble.

4. The wireless device as in claim 3, wherein the short range is about two meters.

5. The wireless device as in claim 3, wherein the induction transceiver is adapted to indicate that the magnetic induction link is broken.

6. The wireless device as in claim 5, further comprising a speaker assembly adapted to output audio information to the user, wherein the induction transceiver is adapted to indicate that the magnetic induction link is broken by causing the speaker assembly to output an audible indication.

7. The wireless headset as in claim 3, wherein the adapter is removably attachable to the half-duplex wireless communications device.

8. The wireless device as in claim 1, wherein the magnetic induction link operates at a frequency from 10 MHz to 15 MHz.

9. The wireless device as in claim 1, further comprising a speaker assembly adapted to output audio information to the user.

10. The wireless device as in claim 9, wherein the at least a portion of the audio information from the user is transmitted as packetized digital information.

11. The wireless device as in claim 10, further comprising:
an encoder adapted to convert an analog signal representative of the audio information from the user into a digital signal; and
a processor operably coupled to the encoder and the induction transceiver, the processor adapted to packetize the digital signal;
wherein the induction transceiver is further adapted to wirelessly transmit the packetized digital signal.

12. The wireless device as in claim 10, wherein the packetized digital signal is encrypted.

13. The wireless device as in claim 9, wherein the speaker assembly includes an earbud speaker.

14. The wireless device as in claim 9, further comprising an earclip.

15. The wireless device as in claim 14, wherein the speaker assembly includes an ear insert for insertion into the user's ear canal.

16. The wireless device as in claim 15, wherein the ear insert comprises a conformable material.

17. The wireless device as in claim 15, wherein the switch is positioned substantially coaxially with the ear insert.

18. The wireless device as in claim 9, further comprising a body supporting the speaker assembly.

19. The wireless device as in claim 18, wherein the switch is positioned on the body.

20. The wireless device as in claim 18, wherein the switch is connected to the body via a wire lead.

21. The wireless device as in claim 1, further comprising:
a processor operably coupled to the induction transceiver, the processor adapted to store a security code, the processor enabling the induction transceiver only where a matching security code is stored at the one of the half-duplex wireless communications device and the adapter coupled to the half-duplex wireless communications device.

22. The wireless device as in claim 1, further comprising a headband.

23. The wireless device as in claim 1, wherein the information indicating that the switch is engaged includes a signal during at least a portion of a period that the switch is engaged.

24. The wireless device as in claim 1, wherein the information indicating that the switch is engaged includes an absence of a signal during at least a portion of a period that the switch is engaged.

25. The wireless device as in claim 1, further comprising an indicator for indicating that the magnetic induction link is established with the one of the half-duplex wireless communications device and the adapter coupled to the half-duplex wireless communications device.

26. The wireless device as in claim 1, wherein the wireless device shuts down after the magnetic induction link is broken for a predetermined period of time.

27. The wireless device as in claim 1, wherein the wireless device receives operational power over the magnetic induction link.

28. The wireless device as in claim 27, further comprising a battery and wherein at least a portion of the operational power received over the magnetic induction link is stored in the battery.

29. An apparatus comprising:
an interface for operably coupling to a half-duplex wireless communications device;
an induction transceiver adapted to receive at least one signal through at least one magnetic induction link from a wireless device comprising a switch and a microphone, the at least one signal comprising a first transmit mode signal indicating a status of the switch and information representative of at least a portion of audio information received at the microphone; and
a processor operably coupled to the transceiver for receiving the at least one signal through the at least one magnetic induction link,
wherein, if the first transmit mode signal indicates that the switched is engaged, the processor provides a second transmit mode signal to the half-duplex wireless communications device to direct the half-duplex wireless communications device to switch to a half-duplex transmit mode for the half-duplex wireless communications device to wirelessly communicate the at least a portion of the audio information to another wireless communications device, and
wherein the at least one signal received from the wireless device comprises the information representative of at least a portion of the audio information regardless of whether the first transmit mode signal indicates that the switch is engaged or disengaged.

30. The apparatus as in claim 29, wherein the processor is adapted to receive the information representative of at least a portion of the audio information via the induction transceiver and provide the information representative of at least a portion of the audio information to the half-duplex wireless communications device via the interface.

31. The apparatus as in claim 29, wherein the wireless device comprises a speaker.

32. The apparatus as in claim 29, wherein the magnetic induction link is a near field magnetic induction link operating over a short range, thus forming a small operational bubble.

33. The apparatus as in claim 32, wherein the short range is about two meters.

34. The apparatus as in claim 29, further comprising an indicator for indicating that the magnetic induction link is established with the wireless device.

35. The apparatus as in claim 29, wherein the processor is adapted to receive audio information from the half-duplex wireless communications device via the interface and transmit at least a portion of the audio information via the induction transceiver.

36. The apparatus as in claim 29, wherein the magnetic induction link operates at a frequency from 10 MHz to 15 MHz.

37. The apparatus as in claim 29, wherein the wireless device comprises a wireless headset.

38. The apparatus as in claim 29, wherein the wireless device comprises a wireless transmit switch assembly.

39. The apparatus as in claim 29, wherein the apparatus is integrated with the half-duplex wireless communications device.

40. The apparatus as in claim 29, wherein the apparatus is separate from the wireless half-duplex communications device.

41. The apparatus as in claim 29, wherein the processor is adapted to store a security code, the processor enabling the apparatus only where a matching security code is stored at the wireless device.

42. The apparatus as in claim 29, wherein the apparatus draws operational power from the half-duplex wireless communications device.

43. The apparatus as in claim 29, further comprising a mechanism for disabling the apparatus, the mechanism configuring the apparatus such that the half-duplex wireless communications device operates as if the apparatus is not present.

44. The apparatus as in claim 29, further comprising another switch for causing the half-duplex wireless communications device to function without the wireless device.

45. The apparatus as in claim 29, wherein the induction transceiver is adapted to provide operational power to the wireless device.

46. A system comprising:
one of a half-duplex wireless communications device and an adapter coupled to the half-duplex wireless communications device; and
a wireless device adapted to wirelessly communicate through at least a magnetic induction link with the one of the half-duplex wireless communications device and an adapter coupled to the half-duplex wireless communications device, the wireless device comprising a switch and a microphone,
wherein the wireless device is adapted to wirelessly transmit information indicating a status of the switch and information representative of at least a portion of the audio information received at the microphone to the one of the half-duplex wireless communications device and the adapter coupled to the half-duplex wireless communications device,
wherein at least one of the information indicating the status of the switch and the information representative of the at least a portion of the audio information is wirelessly transmitted through the magnetic induction link,
wherein, if the information indicating the status of the switch indicates that the switch is engaged, the information indicating that the switch is engaged is used to control the half-duplex wireless communications device to enter a half-duplex wireless transmission mode for the half-duplex wireless communications device to wirelessly communicate the at least a portion of the audio information to another wireless communications device, and
wherein a disengagement of the switch does not prevent the information representative of the at least a portion of the audio information from being transmitted by the wireless device.

47. The system as in claim 46, wherein the switch is operated by a user and wherein the information that indicates that the switch is engaged is wirelessly transmitted when the switch is engaged by the user.

48. The system as in claim 47, wherein the information that indicates that the switch is engaged includes a signal transmitted during at least a portion of a period that the switch is engaged.

49. The system as in claim 47, wherein the information that indicates that the switch is engaged includes an absence of a signal during at least a portion of a period that the switch is engaged.

50. The system as in claim 46, wherein the magnetic induction link is a near field magnetic link operating over a short range, thus forming a small operational bubble.

51. The system as in claim 50, wherein the short range is about two meters.

52. The system as in claim 46, wherein the system is adapted to indicate that the magnetic induction link is broken.

53. The system as in claim 52, wherein the wireless device indicates that the magnetic induction link is broken by outputting an audible indication.

54. The system as in claim 46, wherein the system is adapted to indicate that the magnetic induction link is established.

55. The system as in claim 46, wherein the wireless device is further adapted to wirelessly transmit both the information indicating the status of the switch and the information representative of the at least a portion of the audio information for reception by the one of the half-duplex wireless communications device and the adapter coupled to the half-duplex wireless communications device through the magnetic induction link.

56. The system as in claim 46, wherein at least one of the half-duplex wireless communications device and the adapter coupled to the half-duplex wireless communications device is adapted to wirelessly transmit audio information for reception by the wireless device.

57. The system as in claim 56, wherein the audio information from the wireless device and the audio information from the at least one of the half-duplex wireless communications device and the adapter coupled to the half-duplex wireless communications device is transmitted as packetized digital information.

58. The system as in claim 46, wherein the magnetic induction link operates at frequency from 10 MHz to 15 MHz.

59. The system as in claim 46, wherein the half-duplex wireless communications device is selected from one of a group comprising a two-way radio and a cellular phone.

60. The system as in claim 46, wherein a security code is stored at the wireless device and the magnetic induction link is established upon a determination that a matching security code is stored at the one of the half-duplex wireless communications device and the adapter coupled to the half-duplex wireless communications device.

61. The system as in claim 46, wherein the wireless device shuts down after the magnetic induction link is broken for a predetermined period of time.

62. The system as in claim 46, wherein the wireless device receives operational power from the one of the half-duplex communications wireless device and the adapter coupled to the half-duplex wireless communications device over the magnetic induction link.

63. The system as in claim 62, wherein at least a portion of the operational power received over the magnetic induction link is stored in a battery at the wireless device.

64. The system as in claim 46, wherein the one of the half-duplex wireless communications device and the adapter coupled to the half-duplex wireless communications device includes a mechanism that shuts down the magnetic induction link and activates a microphone in the half-duplex wireless communications device.

65. A system comprising:
one of a half-duplex wireless communications device and an adapter coupled to the half-duplex wireless communications device;
a transmit switch assembly for wirelessly communicating with the one of the half-duplex wireless communications device and the adapter coupled to the half-duplex wireless communications device; and
a wireless device for wirelessly communicating with the one of the half-duplex wireless communications device and the adapter coupled to the half-duplex wireless communications device, the wireless device comprising a microphone for receiving audio information from a user,
wherein at least one of the transmit switch assembly and the wireless device wirelessly communicate with the one of the half-duplex wireless communications device and the adapter coupled to the half-duplex wireless communications device through a magnetic induction link,
wherein the transmit switch assembly is adapted to wirelessly transmit information indicating a status of a switch to the one of the half-duplex wireless communications device and the adapter coupled to the half-duplex wireless communications device,
wherein the wireless device is adapted to wirelessly transmit information representative of at least a portion of the audio information received at the microphone to the one of the half-duplex wireless communications device and the adapter coupled to the half-duplex wireless communications device,
wherein, if the information indicating the status of the switch indicates that the switch is engaged, the information indicating that the switch is engaged is used to control the half-duplex wireless communications device to enter a half-duplex wireless transmission mode for the half-duplex wireless communications device to wirelessly communicate the at least a portion of the audio information to another wireless communications device, and
wherein a disengagement of the switch does not prevent the information representative of the at least a portion of the audio information from being transmitted by the wireless device.

66. The system as in claim 65, wherein the magnetic induction link as a near field magnetic link operating over a short range, thus forming a small operational bubble.

67. The system as in claim 66, wherein the short range is about two meters.

68. The system as in claim 65, wherein the system is adapted to indicate that the magnetic induction link is broken.

69. The system as in claim 68, wherein the wireless device indicates that the magnetic link is broken by outputting an audible indication.

70. The system as in claim 65, wherein the system is adapted to indicate that the magnetic induction link is established.

71. The system as in claim 65, wherein the transmit switch assembly includes the switch, the switch is operated by the user, and information that indicates that the switch is engaged is wirelessly transmitted when the switch is engaged by the user.

72. The system as in claim 71, wherein the information that indicates that the switch is engaged includes a signal transmitted during at least a portion of a period that the switch is engaged.

73. The system as in claim 71, wherein the information that indicates that the switch is engaged includes an absence of a signal during at least a portion of a period that the switch is engaged.

74. The system as in claim 65, wherein the transmit switch assembly includes a speaker for outputting audio information received from the one of the half-duplex wireless communications device and the adapter coupled to the half-duplex wireless communications device.

75. The system as in claim 65, wherein the adapter is removably attachable to the half-duplex wireless communications device.

76. The system as in claim 65, wherein the transmit switch assembly receives operational power through the magnetic induction link.

77. The system as in claim 65, wherein both the wireless device and the transmit switch assembly are adapted to wirelessly communicate with the one of the half-duplex wireless communications device and the adapter coupled to the half-duplex wireless communications device through the magnetic induction link.

78. The system as in claim 65, wherein the wireless device comprises a speaker and wherein the one of the half-duplex wireless communications device and the adapter coupled to the half-duplex wireless communications device is adapted to wirelessly transmit audio information for reception by the wireless device.

79. The system as in claim 78, wherein the audio information from the wireless device and the audio information from the one of the half-duplex wireless communications device and the adapter coupled to the half-duplex wireless communications device is transmitted as packetized digital information.

80. The system as in claim 65, wherein the magnetic induction link operates at frequency from 10 MHz to 15 MHz.

81. The system as in claim 65, wherein a security code is stored at least one of the wireless device and the transmit switch assembly and the magnetic induction link is established upon a determination that a matching security code is stored at the one of the half-duplex wireless communications device and the adapter coupled to the half-duplex wireless communications device.

82. The system as in claim 65, wherein the half-duplex wireless communications device is selected from one of a group comprising a two-way radio and a cellular phone.

83. The system as in claim 65, wherein the wireless device shuts down after the magnetic induction link is broken for a predetermined period of time.

84. The system as in claim 65, wherein at least one of the wireless device and the transmit switch assembly receives operational power from the one of the half-duplex wireless communications device and the adapter coupled to the half-duplex wireless communications device over the magnetic induction link.

85. A wireless device for use with a half-duplex wireless communications device, the wireless device comprising:
a switch for engagement by a user to remotely control the half-duplex wireless communications device to enter a half-duplex transmission mode for the half-duplex wireless communications device to wirelessly communicate with another wireless communications device; and an near field transceiver for wirelessly transmitting a signal through a near field link to one of the half-duplex wireless communications device and an adapter coupled to the half-duplex wireless communications device, the signal comprising information indicating a status of the switch, wherein if the information indicating the status of the switch indicates that the switch is engaged, the information indicating that the switch is engaged is used to control the half-duplex wireless communications device to enter the half-duplex transmission mode for the half-duplex wireless communications device to wirelessly communicate with the other wireless communications device, and wherein a disengagement of the switch does not prevent audio information from being transmitted to the one of the half-duplex wireless communications device and the adapter coupled to the half-duplex wireless communications device.

86. The wireless device as in claim 85, wherein the near field link is a magnetic induction link and the near field transceiver is an induction transceiver.

* * * * *